Patented Feb. 27, 1940

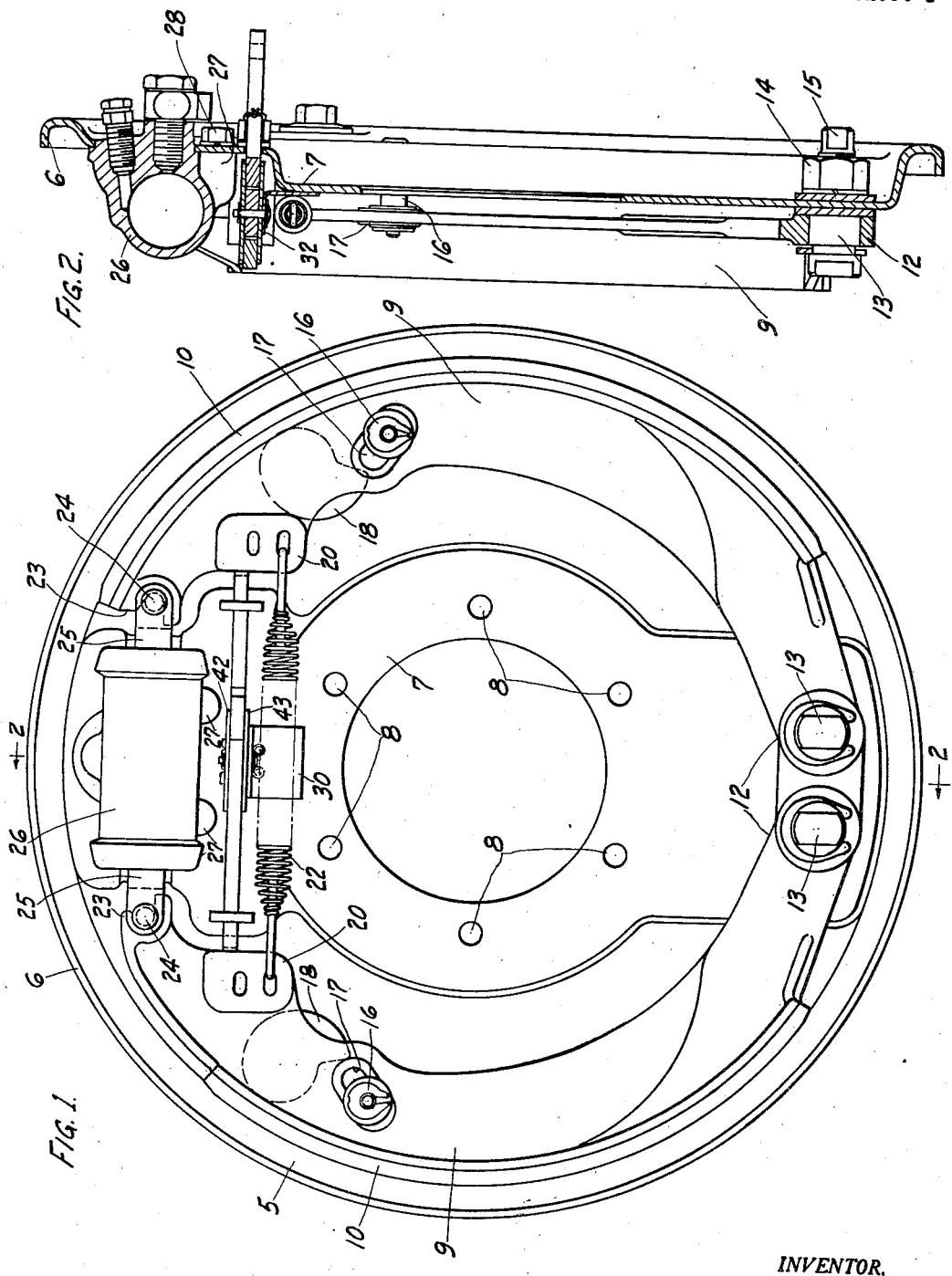

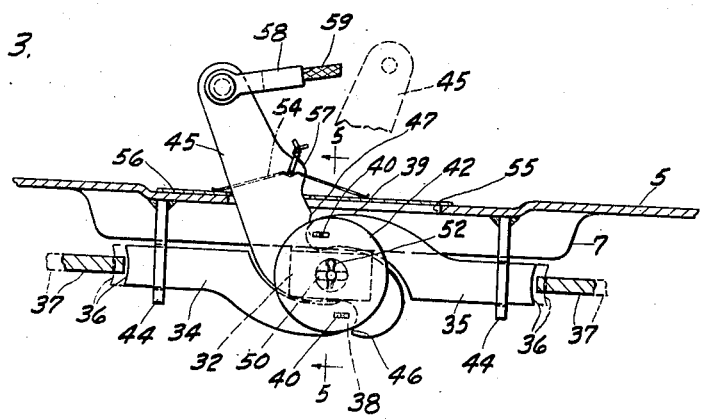
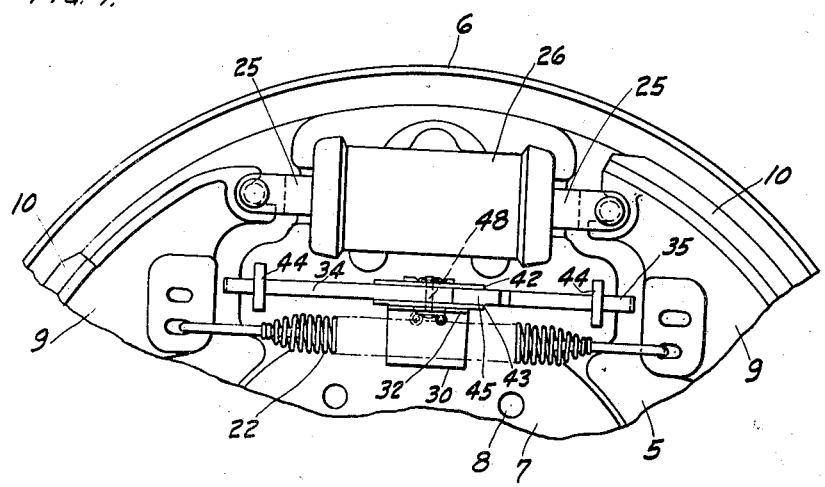
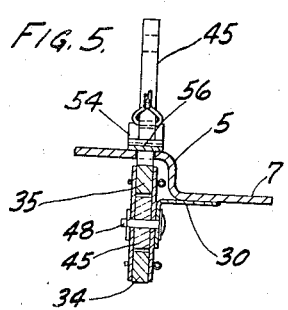

2,192,001

UNITED STATES PATENT OFFICE 2,192,001

BRAKE

Ronald H. Bolster, Buchanan, Mich., assignor to Clark Equipment Company, Buchanan, Mich., a corporation of Michigan Application November 25, 1938, Serial No. 242,176

5 Claims. (Cl. 188—78)

This invention relates to brakes, and more particularly is directed to the adaptation of a parking brake actuating mechanism to the hydraulic brake structure.

As is well known, hydraulic brakes in themselves cannot be used as parking or emergency brakes, since the slightest leakage of the brake fluid releases the braking pressure of the shoes against the drum. As a result, it is necessary to provide a mechanical linkage operated from a hand lever for setting the brakes manually. This linkage must include means within the brake drum housing for mechanically expanding the brake shoes against the drum.

The present invention contemplates a simplified compact arrangement which can readily be mounted within the available space between the shoes on the backing plate, and is extremely economical to manufacture and easy to assemble.

Primarily, the present invention consists of two arms supported on the backing plate and having cam portions at their adjacent ends between which is disposed an operating lever extending out to the inboard side of the backing plate. Suitable cable or linkage connection from the lever to the hand control lever completes the mechanism.

One of the main objects of the present invention resides in the provision of such mechanism supported entirely on the backing plate and requiring no enclosing housing or the like.

Another object of the present invention is the design of a mechanism of this type which will transmit equal pressure to each brake shoe. This is accomplished by providing a floating pivot for the operating lever, whereby the reaction of the arms against the shoe determines the center of rotation of the arms.

Still another feature of the present invention resides in the design of a structure in which all parts can be made from metal stampings, and no machine operations are necessary prior to the assembly of such stampings.

Other objects and advantages of the present invention will be more apparent from the following detailed description which, taken in conjunction with the accompanying drawings, will disclose to those skilled in the art the particular construction and operation of a preferred form of my invention.

In the drawings:

Figure 1 is an elevational view of a brake embodying the present invention;

Figure 2 is a sectional view taken substantially on line 2—2 of Figure 1;

Figure 3 is a top plan view of the brake applying mechanism;

Figure 4 is a partial elevational view of the brake of Figure 1 in expanded position; and Figure 5 is an enlarged sectional view taken substantially on line 5—5 of Figure 3.

Considering now in detail the drawings, there is provided a backing plate 5 having the peripheral flange 6 within which is disposed the lateral edge of a brake drum (not shown), and the offset central portion 7 having the circumferential series of openings 8 adapted to receive securing means for attaching the backing plate to the brake flange of an axle housing arm or wheel spindle. Pivotally mounted within the periphery of the backing plate 5 are a pair of brake shoes 9 having the brake lining 10 on the arcuate outer surface thereof adapted to be forced into engagement with the brake drum. Each of the shoes 9 has a boss portion 12 at one end thereof, which portions are mounted on studs or anchor bolts 13 extending through the brake plate and having suitable nuts 14 for securing them in position. The studs 13 preferably have projecting slabbed off ends 15 whereby they may be rotated to adjust the position of the shoes, the bearing portion about which the boss 12 of the shoes engages being eccentrically disposed with respect to the axis of the stud. The shoes are guided for expanding movement on suitable studs 16 projecting through the backing plate and received within slots 17 formed in the shoes. Suitable adjusting cams 18 are provided which may be rotated from the inboard side of the backing plate to move the shoes toward and away from the the brake drum as the lining 10 wears down. Each of the shoes is preferably provided with a boss portion 20 apertured to receive the end of a coil spring member 22 extending between the shoes and normally tending to contract the same out of engagement with the brake drum.

At their upper ends the shoes are provided with arcuately recessed end portions 23 which are adapted to receive the extending pin ends 24 of the piston rods 25 projecting into the hydraulic cylinder 26. The hydraulic cylinder 26 is of the conventional type and is mounted on the backing plate by means of the boss portions 27, which are tapped to receive the cap screws 28. It will be apparent that when fluid is forced into the cylinder 26 under pressure the piston rods 25 are expanded or moved outwardly of the ends of the cylinder, thereby applying pressure to the ends 23 of the brake shoes forcing these shoes to expand into frictional contact with the brake drum.

Mounted on the wall of the backing plate is an L-shaped support member 30 which may be spot welded, riveted, or otherwise secured thereto, and which has the normally extending shelf portion 32 which supports the mechanical brake actuating mechanism. This mechanism, as shown more in detail in Figure 3, comprises a pair of arms 34 and 35, each of the arms having a curved end portion 36 adapted to engage the flange 37 of the respective brake shoes, this flange being formed adjacent the upper end of the boss portion 20. The opposite ends of the arms 34 and 35 are provided with arcuate cam ends 38 and 39 respectively, which are adapted to be pinned by pins 40 between two disc-shaped washers 42 and 43. The washer 43 rests upon the shelf portion 32 of the member 30 and thereby supports the arms 34 and 35 against movement out of planar relationship. Suitable guide members 44 are welded to the backing plate 5 above the offset portion 7 thereof, and are suitably apertured to receive the extending portions of the arms and to guide the same for movement transversely therethrough.

Intermediate the cam ends of the arms there is provided a brake operating lever, indicated generally at 45, having a cam portion 46 adapted to engage the cam end 38 of the arm 34 and a cam portion 47 adapted to engage the cam end 39 of the arm 35. The lever 45 is pivotally mounted on a pin 48 having a head portion engaging the under surface of the shelf portion 32 of the support 30 and extending through the two washers 42 and 43 and through the arm 45 intermediate the cam portions 46 and 47 thereof. The shelf portion 32 is preferably apertured and provided with a longitudinally extending slot 50 allowing for slight longitudinal movement of the pin 48 therein, and thereby providing a floating support for the pivot of the lever 45. The pin 48 projects upwardly beyond the upper surface of the washer 42, and is held in position by a suitable spring clip member 52 engaging in a groove therein, this being sufficient inasmuch as there is no axial thrust of the mechanism along the pin 48.

The backing plate 5 is provided with a longitudinal slot 55 to accommodate the arcuate movement of the lever 45 in the brake applying and releasing positions, and this opening is preferably covered by a cover plate 56 which closely fits about the arm 45 inwardly of the boss 57 and has sliding movement over the inboard surface of the backing plate as the lever arm is rotated about its pivot. A suitable spring clip 54 is biased against the plate 56 to hold it firmly against the surface of the backing plate to prevent rattling thereof and to prevent possible displacement of the plate 56, which might allow dirt or water to enter the opening 55.

The outer end of the lever is apertured to receive a suitable clevis 58 to which is connected a cable 59 leading to any suitable brake applying means; such as a hand brake lever, parking brake lever, or the like.

In the operation of the mechanism thus far described, the tension on the cable 59 results in rotating the arm 45 about the pivot pin 48. This produces pressure of the cam surfaces 46 and 47 against the lever ends 38 and 39 of the arms 34 and 35. These arms shift longitudinally to engage the flanges 37 of the shoes 9, thereby expanding the shoes against the pressure of spring 22. The pins 40 prevent any possible displacement of the lever ends 38 and 39 out of the cam notches or recesses 46 and 47 of the lever 45, since the pins are carried by the washers 42 and 43 which in turn are secured on opposite faces of the lever 45 by means of the pin 48. By reason of the slot 50 in the supporting flange 32 of the member 30 it will be apparent that the applying pressure of the arms 34 and 35 against the brake shoes 9 will be equalized since the pin 48 can shift longitudinally in the slot so that it will find a position wherein equallized pressure is applied by each of the arms of the lever 45. This insures equalized pressure of the arms 34 and 35 against the shoes 9 when the parking or emergency brake mechanism is actuated. By reason of the spring clip 54 engaging the cover plate 56 the entrance of water or dirt into the slot 55 is precluded, thus protecting the internal portion of the brake mechanism against entrance of foreign materials. The two guides 44 secured to the backing plate serve to locate the arms 34 and 35 so that they will apply proper expanding pressure against the shoes, and also serve to hold the ends of the mechanism so that no center buckling will occur which might place an axial stress on the pin 48 holding the actuating parts together.

As shown in Figure 4, the hydraulic brake mechanism in this figure has been expanded in a normal surface braking operation. It will be noted that this leaves the ends of the arms 34 and 35 out of engagement with the brake shoes 9 as the shoes have been moved away from the arm ends. However, when the cylinder 26 is not subjected to fluid pressure and the pistons 25 are retracted by reason of spring 22, operation of the lever 45 will produce a braking application similar to that produced by the hydraulic actuating mechanism.

It is therefore believed apparent that I have provided a novel type of mechanical brake applying mechanism to be employed in conjunction with hydraulic brake assembly, which is simple in design, can be readily manufactured from stampings, and can be easily assembled into the space now available in the conventional type of hydraulic brake construction.

I am aware that various changes may be made in certain details of the present invention without departing from the underlying principles thereof, and I therefore do not intend to be limited except as defined by the scope and spirit of the appended claims.

I claim:

1. A brake actuating mechanism including two flat coplanar brake shoe engaging arms having adjacent oppositely curved ends, a lever extending in the plane of said arms and pivoted therebetween, said lever having cam portions on opposite sides of its pivotal support engaging said arm ends, and means overlying said cam portions and arm ends and pinned to said arm ends for rotation about said lever pivot upon actuation of the lever for maintaining said arm ends against displacement from said cam portions.

2. In combination, coplanar flat arms extending in opposite directions and having arcuate end portions overlapping each other laterally, a coplanar lever extending between said ends and having oppositely turned cam surfaces engaging said arm ends, a pivot for said lever intermediate said arm ends, means supporting said pivot and allowing movement thereof longitudinally relative to said arms whereby upon rotation of said lever for camming said arms in opposite directions said pivot will move into an equalizing position in said supporting means, and means connected between said lever pivot and said arm end portions preventing movement of said arms out of planar alinement with said lever.

3. In combination, a brake backing plate having a pair of brake shoes pivoted thereon, spring means normally tending to contract said shoes, a support intermediate said shoes, a guide secured to said plate intermediate each shoe and said support, co-planar arms each extending through one of said guides and having a curved end overlapping said support, a pair of circular washers overlying the ends of said arms and pivotally connected thereto, and a lever pivoted on said support and extending between said curved arm ends, said pivot extending through the axes of said washers, said lever having cam portions engaging said ends whereby rotation of said lever moves said arms in opposite directions to expand said shoes and said washers prevent disengagement of said arm ends from said cam portions.

4. In combination, a brake actuating mechanism comprising an actuating lever, a fixed support having a slot therein, a pivot for one end of said lever guided in said slot, a pair of oppositely extending arms each having a curved end portion engaging the lever on opposite sides of the pivot thereof, whereby rotation of the lever will move said arms in opposite directions, fixed means guiding the opposite end of each arm, and means carried by the lever pivot overlying said arm end portions and pinned thereto preventing disengagement thereof from said lever and maintaining the same in coplanar alinement.

5. In combination, a brake actuating mechanism comprising an actuating lever, a fixed support having a slot therein, a pivot for one end of said lever guided in said slot, a pair of oppositely extending arms each having a curved end portion engaging the lever on opposite sides of the pivot thereof, whereby rotation of the lever will move said arms in opposite directions, and means carried by the lever preventing disengagement of said arms therefrom.

RONALD H. BOLSTER.